(12) United States Patent
Hayashi et al.

(10) Patent No.: US 7,081,174 B2
(45) Date of Patent: Jul. 25, 2006

(54) PROCESS FOR PRODUCING STEEL PRODUCTS HAVING IMPROVED GRAIN SIZE PROPERTIES AND MACHINABILITY

(75) Inventors: Ryoji Hayashi, Himeji (JP); Makoto Iguchi, Himeji (JP)

(73) Assignee: Sanyo Special Steel Co., Ltd., Hyogo-Ken (JP)

( * ) Notice: Subject to any disclaimer, the term of this patent is extended or adjusted under 35 U.S.C. 154(b) by 171 days.

(21) Appl. No.: 10/424,577

(22) Filed: Apr. 28, 2003

(65) Prior Publication Data

US 2004/0048217 A1    Mar. 11, 2004

(30) Foreign Application Priority Data

Apr. 30, 2002  (JP) .............................. 2002-127814
Apr. 30, 2002  (JP) .............................. 2002-127816

(51) Int. Cl.
*C21D 9/52*  (2006.01)
*C21D 8/06*  (2006.01)
*C22C 38/14* (2006.01)

(52) U.S. Cl. ...................... 148/598; 148/649; 148/328; 148/320; 148/319

(58) Field of Classification Search ................ 148/598, 148/649, 328, 320, 319
See application file for complete search history.

(56) References Cited

U.S. PATENT DOCUMENTS 6,261,388 B1 * 7/2001 Kubota et al. .............. 148/330

6,699,333 B1 * 3/2004 Dubois ........................ 148/319
2003/0047242 A1   3/2003 Nishimori et al.

FOREIGN PATENT DOCUMENTS

| JP | 08-283910  | 10/1996 |
| JP | 11-092824  | 4/1999  |
| JP | 2000-080446 | 3/2000 |
| JP | 2001-073067 | 3/2001 |

* cited by examiner

*Primary Examiner*—Roy King
*Assistant Examiner*—Michael P. Alexander
(74) *Attorney, Agent, or Firm*—The Webb Law Firm

(57) ABSTRACT

Disclosed is a production process of a steel product for induction hardening and a steel product for carburizing, having improved grain size properties and machinability. This production process comprises the steps of: providing an ingot or bloom comprising a steel comprising, by weight, carbon (C): 0.10 to 0.45% or 0.25 to 0.70%, silicon (Si): 0.03 to 1.0%, manganese (Mn): 0.2 to 2.0%, titanium (Ti): 0.05 to 0.2%, aluminum (Al): 0.005 to 0.05%, and nitrogen (N): not more than 0.01% with the balance consisting of iron (Fe) and unavoidable impurities; and subjecting the steel ingot or bloom to a series of hot working steps including the step of rolling the steel ingot or bloom into a semi-finished steel product, the step of rolling the semi-finished steel product into a steel bar or wire rod, and the step of forging the steel bar or wire rod into a product. In the above series of hot working steps, the steel is given a thermal history in which said steel is at least once heated to 1,250° C. or above, is cooled to room temperature, and is then reheated to a temperature range of 800 to 1,100° C.

12 Claims, No Drawings

PROCESS FOR PRODUCING STEEL PRODUCTS HAVING IMPROVED GRAIN SIZE PROPERTIES AND MACHINABILITY

BACKGROUND OF THE INVENTION

1. Field of the Invention

The present invention relates to steel products having improved grain size properties and machinability, and more particularly to steel products for carburizing and steel products for induction hardening and a process for producing the same.

2. Background Art

In general, steels for carburizing are subjected to hot working, cold working, machining and the like to form a predetermined product shape. Subsequently, the steels are carburized at 900° C. or above and quenched and are then tempered. In this case, however, in the carburizing, grains sometimes coarsen depending upon a combination of a former structure, carburizing conditions and the like. In order to prevent grain coarsening, for example, the content of aluminum (Al), niobium (Nb), nitrogen (N) or the like in the steel material is controlled to utilize precipitates of AlN, NbCN or the like as pinning particles. Thus, the prevention of coarsening of grains in the carburizing has been desired.

On the other hand, in automobile components and components for industrial machines, in many cases, medium- or high-carbon steels subjected to induction hardening and tempering have hitherto been used. Grain coarsening can be a main cause of deteriorated mechanical properties of these induction hardened components. In order to avoid the grain coarsening, it is important that, in the austenitizing, the temperature of the steel is not raised to an excessively high temperature. Nevertheless, in the induction hardening, a temperature gradient is likely to appear from the surface toward the inside of the steel because the steel should be heated in a short time. As a result, the temperature of a portion near the surface of the steel is likely to be higher than the other portions. In particular, when a relatively large case depth is contemplated, the temperature of the inside of the steel should also be raised to a value high enough to cause austenitizing. Therefore, the temperature of a portion near the surface of the steel becomes still higher. Thus, induction hardening can be said to be a heat treatment method which is likely to cause grain coarsening particularly in a portion near the surface of the steel. For this reason, also in the steel for induction hardening, the prevention of grain coarsening in the induction hardening has been desired.

Japanese Patent Laid-Open No. 283910/1996 discloses a steel material for induction hardening in which grain coarsening has been suppressed by finely precipitating TiN, AlN, niobium (Nb) carbonitride, and vanadium (V) carbonitride for pinning of grain boundaries. Since, however, these precipitates are not satisfactorily fine, satisfactory anti-grain-coarsening effect cannot be attained in the induction hardening.

Japanese Patent Laid-Open No. 80446/2000 discloses a titanium(Ti)-added steel for induction hardening. In this titanium(Ti)-added steel, not less than 0.05% of titanium has been added to a steel to precipitate a titanium compound and titanium carbonitride which can improve anti-grain-coarsening effect. This technique, however, does not aim at machinability. At the present time, any steel product for quenching having excellent machinability, which is an as-hot worked product and has not been subjected to an additional heat treatment such as annealing, is not known.

SUMMARY OF THE INVENTION

The present inventors have now found that steel products having improved grain size properties and machinability can be produced by specifying the chemical composition of a steel material and a thermal history of the steel in the production of the steel product without any additional heat treatment such as annealing.

Accordingly, an object in a first aspect of the present invention is to provide a process for producing a steel product for carburizing having improved grain size properties and machinability.

Thus, in the first aspect of the present invention, there is provided a process for producing a titanium(Ti)-containing steel product for carburizing, said process comprising the steps of:

providing an ingot or bloom comprising a steel comprising, by weight, carbon (C): 0.10 to 0.45%, silicon (Si): 0.03 to 1.0%, manganese (Mn): 0.2 to 2.0%, titanium (Ti): 0.05 to 0.2%, aluminum (Al): 0.005 to 0.05%, and nitrogen (N): not more than 0.01% with the balance consisting of iron (Fe) and unavoidable impurities; and subjecting said steel ingot or bloom to a series of hot working steps including the step of rolling the steel ingot or bloom into a semi-finished steel product, the step of rolling the semi-finished steel product into a steel bar or wire rod, and the step of forging the steel bar or wire rod into a product, wherein, in said series of hot working steps, said steel is given a thermal history in which said steel is at least once heated to 1,250° C. or above, is cooled to room temperature, and is then reheated to a temperature range of 800 to 1,100° C.

Further, in the first aspect of the present invention, there is provided a steel product for carburizing produced by said process, said steel product comprising a steel comprising, by weight, carbon (C): 0.10 to 0.45%, silicon (Si): 0.03 to 1.0%, manganese (Mn): 0.2 to 2.0%, titanium (Ti): 0.05to 0.2%, aluminum (Al): 0.005 to 0.05%, and nitrogen (N): not more than 0.01% with the balance consisting of iron (Fe) and unavoidable impurities, wherein said steel contains not more than 10,000 dispersedly precipitated titanium compounds per $\mu m^2$, has a hardness of not more than 100 HRB, and, when carburized, permits the number of dispersedly precipitated titanium compounds to be not less than 50 per $\mu m^2$.

An object in a second aspect of the present invention is to provide a process for producing a steel product for induction hardening having improved grain size properties and machinability.

Thus, in the second aspect of the present invention, there is provided a process for producing a titanium(Ti)-containing steel product for induction hardening, said process comprising the steps of:

providing an ingot or bloom comprising a steel comprising, by weight, carbon (C): 0.25 to 0.70%, silicon (Si): 0.03 to 1.0%, manganese (Mn): 0.2 to 2.0%, titanium (Ti): 0.05 to 0.2%, aluminum (Al): 0.005 to 0.05%, and nitrogen (N): not more than 0.01% with the balance consisting of iron (Fe) and unavoidable impurities; and subjecting said steel ingot or bloom to a series of hot working steps including the step of rolling the steel ingot or bloom into a semi-finished steel product, the step of rolling the semi-finished steel product into a steel bar or wire rod, and the step of forging the steel bar or wire rod into a product, wherein, in said series of hot working steps, said steel is given a thermal history in which said steel is at least once heated to 1,250° C. or above, cooled to room temperature, and is then reheated to a temperature range of 800 to 1,100° C.

Further, in the second aspect of the present invention, there is provided a steel product for induction hardening produced by said process, said steel product comprising a steel comprising, by weight, carbon (C): 0.25 to 0.70%, silicon (Si): 0.03 to 1.0%, manganese (Mn): 0.2 to 2.0%, titanium (Ti): 0.05 to 0.2%, aluminum (Al): 0.005 to 0.05%, and nitrogen (N): not more than 0.01% with the balance consisting of iron (Fe) and unavoidable impurities, wherein said steel contains not more than 10,000 dispersedly precipitated titanium compounds per $\mu m^2$, has a hardness of not more than 103 HRB, and, when subjected to high frequency induction heating, permits the number of dispersedly precipitated titanium compounds to be not less than 50 per $\mu m^2$.

DETAILED DESCRIPTION OF THE INVENTION

Production Process According to First Aspect of Invention

The production process according to the first aspect of the present invention is a process for producing a titanium(Ti)-containing steel product for carburizing. In this production process, an ingot or bloom of a steel comprising, by weight, carbon (C): 0.10 to 0.45%, silicon (Si): 0.03 to 1.0%, manganese (Mn): 0.2 to 2.0%, titanium (Ti): 0.05 to 0.2%, aluminum (Al): 0.005 to 0.05%, and nitrogen (N): not more than 0.01% with the balance consisting of iron (Fe) and unavoidable impurities is first provided.

The reasons for the limitation of the contents of individual metallic components in a steel used in the present invention will be described.

Carbon (C) is an element that is necessary for ensuring the strength of an as-carburized core part as a component for machine construction. When the content of carbon is less than 0.10%, the contemplated effect cannot be satisfactorily attained. On the other hand, when the carbon content exceeds 0.45%, the toughness of the core part is deteriorated. For this reason, the carbon content is limited to 0.10 to 0.45%.

Silicon (Si) is an element that is necessary for attaining deoxidation effect. When the content of silicon is less than 0.03%, the contemplated effect cannot be satisfactorily attained. On the other hand, when the silicon content exceeds 1.0%, the workability is deteriorated. Further, in this case, at the time of carburizing, the formation of an intergranular oxide layer is accelerated, and fatigue properties are deteriorated. For the above reason, the silicon content is limited to 0.03 to 1.0%.

Manganese (Mn) is an element that is necessary for ensuring hardenability. When the content of manganese is less than 0.2%, the contemplated effect cannot be satisfactorily attained. On the other hand, when the manganese content exceeds 2.0%, segregation in the steel occurs, resulting in deteriorated workability. For the above reason, the manganese content is limited to 0.2 to 2.0%.

Titanium (Ti) is an element that is necessary for suppressing coarsening of austenite grains at the time of carburizing by finely precipitating a titanium carbide, a titanium-containing composite carbonitride, and a titanium nitride. When the content of titanium is less than 0.05%, the contemplated effect cannot be satisfactorily attained. On the other hand, when the titanium content exceeds 0.2%, the amount of the precipitates is so large that the workability is deteriorated. For the above reason, the titanium content is limited to 0.05 to 0.2%.

Aluminum (Al) is an element that is used as a deoxidizer. When the content of aluminum is less than 0.005%, the contemplated effect cannot be satisfactorily attained. On the other hand, when the aluminum content exceeds 0.05%, the amount of alumina-type oxide is increased. This results in deteriorated fatigue properties and workability. For the above reason, the aluminum content is limited to 0.005 to 0.05%.

Nitrogen (N), when contained in an amount of more than 0.01%, causes an increase in the amount of TiN which adversely affects the fatigue properties and machinability and, in addition, makes it impossible to ensure the amount of titanium necessary for suppressing the grain coarsening. For the above reason, the content of nitrogen is limited to not more than 0.01%.

According to a preferred embodiment of the present invention, the steel used in the production process of the present invention may further comprise 0.0005 to 0.0050% of boron (B). Boron is an element that, when added in a very small amount, can significantly improve the hardenability of the steel. Further, boron segregates in grain boundaries to suppress the intergranular fracture. This can contribute to significantly improved strength and toughness. When the content of boron is less than 0.0005%, the contemplated effect cannot be satisfactorily attained. On the other hand, when the boron content exceeds 0.0050%, the hot workability is deteriorated.

According to a preferred embodiment of the present invention, the steel used in the production process of the present invention may further comprise one or more elements selected from not more than 2.0% of chromium (Cr), not more than 3.0% of nickel (Ni), and not more than 1.5% of molybdenum (Mo), depending upon applications of the steel product. Chromium, nickel, and molybdenum are elements that can improve the hardenability and the toughness and can be optionally added. When these elements are added in amounts above the above-defined respective ranges, however, the effect is saturated.

According to a preferred embodiment of the present invention, the steel used in the production process of the present invention may further comprise one or more elements selected from 0.02 to 0.30% of vanadium (V) and 0.02 to 0.10% of niobium (Nb), depending upon applications of the steel product. Vanadium and niobium form carbides and, as with titanium, are effective in suppressing the coarsening of austenite grains. When the content of vanadium and niobium is less than 0.02%, the contemplated effect cannot be attained. On the other hand, when the content of vanadium exceeds 0.30% or when the content of niobium exceeds 0.10%, the amount of the precipitate is so large that the workability is deteriorated.

According to a preferred embodiment of the present invention, the steel used in the production process of the present invention may further comprise one or more elements selected from not more than 0.3% of lead (Pb), not more than 0.3% of bismuth (Bi), not more than 0.2% of sulfur (S), and not more than 0.01% of calcium (Ca). Lead is an element that is useful for improving chip disposability and machinability without substantially deteriorating the anisotropy of the mechanical properties. When the content of lead exceeds 0.3%, the contemplated effect is saturated. Further, environmental problems should also be taken into consideration. For the above reason, preferably, the upper limit of the lead content is 0.3%. As with lead, bismuth is an element that is useful for improving chip disposability and machinability without substantially deteriorating the anisotropy of the mechanical properties. When the content of bismuth exceeds 0.3%, the contemplated effect is saturated. Further, environmental problems should also be taken into consideration. For the above reason, preferably, the upper limit of the bismuth content is 0.3%. Sulfur is an element that is useful for improving the machinability. When the content of sulfur exceeds 0.2%, the contemplated effect is saturated and, in addition, the anisotropy of the mechanical properties is increased. Therefore, preferably, the upper limit of the sulfur content is 0.2%. Calcium is an element that is useful for improving the machinability. When the content of calcium exceeds 0.01%, the contemplated effect is saturated and, in addition, the amount of oxide inclusions is increased, resulting in deteriorated mechanical properties. Therefore, preferably, the upper limit of the calcium content is 0.01%.

In the production process of the present invention, an ingot or bloom of a steel having the above chemical composition is subjected to a series of hot working steps including the step of rolling the steel ingot or bloom into a semi-finished steel product, the step of rolling the semi-finished steel product into a steel bar or wire rod, and the step of forging the steel bar or wire rod into a product. In the series of hot working steps, the steel is given a thermal history in which the steel is at least once heated to 1,250° C. or above, is cooled to room temperature, and is then reheated to a temperature range of 800 to 1,100° C.

That is, in this thermal history, the steel is first at least once heated to 1,250° C. or above so that titanium compounds such as titanium carbide and titanium carbonitride fully form a solid solution. When the heating temperature is below 1,250° C., the titanium compounds do not fully form a solid solution and, at the time of casting, titanium compounds, which have been precipitated in a large size of not less than 1 μm, are retained. This causes lack of effective titanium content. Consequently, the number of TiC compounds at the time of carburizing is not more than 50 per μm$^2$, and grain size properties are deteriorated.

Next, the steel heated to 1,250° C. or above is cooled to room temperature and is then reheated to a temperature range of 800 to 1,100° C., whereby a steel product possessing improved grain size properties and machinability is provided. In this case, when the temperature, to which the steel is reheated after cooling to room temperature from 1,250° C. or above, is 1,100 to 1,250° C. and, at the same time, when working (rolling and/or forging) is carried out while holding the steel in this temperature range (provided that, thereafter, the steel is not reheated to the temperature of 1,250° C. or above), coarse titanium compounds having a size of not less than 100 nm are precipitated or retained. This causes lack of effective titanium content. As a result, the number of TiC compounds, which are dispersedly precipitated at the time of carburizing, is not more than 50 per μm$^2$ and, consequently, the grain size properties are deteriorated. Further, upon the reheating to the temperature range of 1,100 to 1,250° C., TiC begins to form a solid solution. In this case, after cooling, coherent precipitation occurs, and fine titanium compounds having a size of not more than 10 nm, which contribute to an increase in hardness, are precipitated in large quantities. As a result, the number of titanium compounds after hot working is not less than 10,000 per μm$^2$. This brings about an increase in hardness which disadvantageously deteriorates the machinability.

On the other hand, when the temperature, to which the steel is reheated after cooling to room temperature from 1,250° C. or above, is below 800° C., or when the steel is not reheated at all, coherent precipitation occurs and fine titanium compounds having a size of not more than 10 nm, which contribute to an increase in hardness, are precipitated in large quantities. As a result, the number of titanium compounds is not less than 10,000 per μm$^2$. This brings about an increase in hardness which disadvantageously deteriorates the machinability.

According to a preferred embodiment of the present invention, the above-described series of hot working steps are carried out so as to satisfy a requirement that the number of titanium compounds dispersedly precipitated in the steel product upon the hot working is not more than 10,000 per μm$^2$ and, when the steel product is carburized after the hot working, the number of dispersedly precipitated titanium compounds is not less than 50 per μm$^2$. Specifically, when the number of titanium compounds, which are dispersedly precipitated upon hot working (rolling and/or forging), are more than 10,000 per μm$^2$, the hardness is disadvantageously enhanced due to precipitation strengthening effect. Consequently, the machinability is deteriorated. On the other hand, when the number of titanium compounds dispersedly precipitated at the time of carburizing is not more than 50 per μm$^2$, the number of precipitates, which suppress the coarsening of grains at the time of carburizing, is so small that the grain size properties are deteriorated.

According to a preferred embodiment of the present invention, the production process further comprises the step of cooling the steel product after the above series of hot working and, in the step of cooling, the steel product is cooled from 800° C. to 500° C. at an average cooling rate of not more than 5° C./sec to bring the hardness of the steel product after the hot working to not more than 100 HRB. Specifically, when the average rate of cooling from 800° C. to 500° C. after the final hot working exceeds 5° C./sec, bainite and fine pearlite are formed. Due to this phenomenon, the hardness after hot working exceeds 100 HRB, leading to a fear of deteriorating the machinability.

Thus, according to the first aspect of the present invention, the number of titanium compounds dispersedly precipitated upon hot working can be brought to not more than 10,000 per μm$^2$, and, in addition, the number of titanium compounds dispersedly precipitated at the time of subsequent carburizing can be brought to not less than 50 per μm$^2$. By virtue of this, a steel product for carburizing possessing excellent grain size properties and machinability can be provided. Further, when the average rate of cooling from 800° C. to 500° C. after the final hot working is not more than 5° C./sec, the hardness of the steel after the hot working can be brought to not more than 100 HRB and, consequently, a deterioration in machinability can be prevented.

Production Process According to Second Aspect of Invention

The steel product according to the second aspect of the present invention is a titanium(Ti)-containing steel product for induction hardening. In the production process of this product, an ingot or bloom comprising a steel comprising, by weight, carbon (C): 0.25 to 0.70%, silicon (Si): 0.03 to 1.0%, manganese (Mn): 0.2 to 2.0%, titanium (Ti): 0.05 to 0.2%, aluminum (Al): 0.005 to 0.05%, and nitrogen (N): not more than 0.01% with the balance consisting of iron (Fe) and unavoidable impurities is first provided.

The reasons for the limitation of the contents of individual metallic components in a steel used in the present invention will be described.

Carbon (C) is an element that is necessary for ensuring the hardness of the steel after induction hardening as a component for machine construction. When the content of carbon is less than 0.25%, the contemplated effect cannot be satisfactorily attained. On the other hand, when the carbon content exceeds 0.70%, the hardness after the induction hardening is saturated, and, at the same time, the workability is deteriorated. For the above reason, the carbon content is limited to 0.25 to 0.70%.

Silicon (Si) is an element that is necessary for attaining deoxidation effect. When the content of silicon is less than 0.03%, the deoxidation effect cannot be satisfactorily attained. On the other hand, when the silicon content exceeds 1.0%, the workability is deteriorated. For the above reason, the silicon content is limited to 0.03 to 1.0%.

Manganese (Mn) is an element that is necessary for ensuring hardenability. When the content of manganese is less than 0.2%, the contemplated effect cannot be satisfactorily attained. On the other hand, when the manganese content exceeds 2.0%, segregation in the steel occurs, resulting in deteriorated workability. For the above reason, the manganese content is limited to 0.2 to 2.0%.

Titanium (Ti) is an element that is necessary for suppressing coarsening of austenite grains at the time of high frequency induction heating by finely precipitating a titanium carbide, a titanium-containing composite carbonitride, and a titanium nitride. When the content of titanium is less than 0.05%, the contemplated effect cannot be satisfactorily attained. On the other hand, when the titanium content exceeds 0.2%, the amount of the precipitates is so large that the workability is deteriorated. For the above reason, the titanium content is limited to 0.05 to 0.2%.

Aluminum (Al) is an element that is used as a deoxidizer. When the content of aluminum is less than 0.005%, the contemplated effect cannot be satisfactorily attained. On the other hand, when the aluminum content exceeds 0.05%, the amount of alumina-type oxide is increased. This results in deteriorated fatigue properties and workability. For the above reason, the aluminum content is limited to 0.005 to 0.05%.

Nitrogen (N), when contained in an amount of more than 0.01%, causes an increase in the amount of TiN which adversely affects the fatigue properties and, in addition, makes it impossible to ensure the amount of titanium necessary for suppressing the grain coarsening. For the above reason, the content of nitrogen is limited to not more than 0.01%.

According to a preferred embodiment of the present invention, the steel used in the production process of the present invention may further comprise 0.0005 to 0.0050% of boron (B). Boron is an element that, when added in a very small amount, can significantly improve the hardenability of the steel. Further, boron segregates in grain boundaries to suppress the intergranular fracture. This can contribute to significantly improved strength and toughness. When the content of boron is less than 0.0005%, the contemplated effect cannot be satisfactorily attained. On the other hand, when the boron content exceeds 0.0050%, the hot workability is deteriorated.

According to a preferred embodiment of the present invention, the steel used in the production process of the present invention may further comprise one or more elements selected from not more than 2.0% of chromium (Cr), not more than 3.0% of nickel (Ni), and not more than 1.5% of molybdenum (Mo), depending upon applications of the steel product. Chromium, nickel, and molybdenum are elements that can improve the hardenability and the toughness and can be optionally added. When these elements are added in amounts above the above-defined respective ranges, however, the effect is saturated.

According to a preferred embodiment of the present invention, the steel used in the production process of the present invention may further comprise one or more elements selected from 0.02 to 0.30% of vanadium (V) and 0.02 to 0.10% of niobium (Nb), depending upon applications of the steel product. Vanadium and niobium form carbides and, as with titanium, are effective in suppressing the coarsening of austenite grains. When the content of vanadium and niobium is less than 0.02%, the contemplated effect cannot be attained. On the other hand, when the content of vanadium exceeds 0.30% or when the content of niobium exceeds 0.10%, the amount of the precipitate is so large that the workability is deteriorated.

According to a preferred embodiment of the present invention, the steel used in the production process of the present invention may further comprise one or more elements selected from not more than 0.3% of lead (Pb), not more than 0.3% of bismuth (Bi), not more than 0.2% of sulfur (S), and not more than 0.01% of calcium (Ca). Lead is an element that is useful for improving chip disposability and machinability without substantially deteriorating the anisotropy of the mechanical properties. When the content of lead exceeds 0.3%, the contemplated effect is saturated. Further, environmental problems should also be taken into consideration. For the above reason, preferably, the upper limit of the lead content is 0.3%. As with lead, bismuth is an element that is useful for improving chip disposability and machinability without substantially deteriorating the anisotropy of the mechanical properties. When the content of bismuth exceeds 0.3%, the contemplated effect is saturated. Further, environmental problems should also be taken into consideration. For the above reason, preferably, the upper limit of the bismuth content is 0.3%. Sulfur is an element that is useful for improving the machinability. When the content of sulfur exceeds 0.2%, the contemplated effect is saturated and, in addition, the anisotropy of the mechanical properties is increased. Therefore, preferably, the upper limit of the sulfur content is 0.2%. Calcium is an element that is useful for improving the machinability. When the content of calcium exceeds 0.01%, the contemplated effect is saturated and, in addition, the amount of oxide inclusions is increased, resulting in deteriorated mechanical properties. Therefore, preferably, the upper limit of the calcium content is 0.01%.

In the production process of the present invention, an ingot or bloom of a steel having the above chemical composition is subjected to a series of hot working steps including the step of rolling the steel ingot or bloom into a semi-finished steel product, the step of rolling the semi-finished steel product into a steel bar or wire rod, and the step of forging the steel bar or wire rod into a product. In the series of hot working steps, the steel is given a thermal history in which the steel is at least once heated to 1,250° C. or above, is cooled to room temperature, and is then reheated to a temperature range of 800 to 1,100° C.

That is, in this thermal history, the steel is first at least once heated to 1,250° C. or above so that titanium compounds such as titanium carbide and titanium carbonitride fully form a solid solution. When the heating temperature is below 1,250° C., the titanium compounds do not fully form a solid solution and, at the time of casting, titanium compounds, which have been precipitated in a large size of not less than 1 μm, are retained. This causes lack of effective titanium content. Consequently, the number of TiC compounds at the time of high frequency induction heating is not more than 50 per $\mu m^2$, and grain size properties are deteriorated.

Next, the steel heated to 1,250° C. or above is cooled to room temperature and is then reheated to a temperature range of 800 to 1,100° C., whereby a steel product possessing improved grain size properties and machinability is provided. In this case, when the temperature, to which the steel is reheated after cooling to room temperature from 1,250° C. or above, is 1,100 to 1,250° C. and, at the same time, when working (rolling and/or forging) is carried out while holding the steel in this temperature range (provided that, thereafter, the steel is not reheated to the temperature of 1,250° C. or above), coarse titanium compounds having a size of not less than 100 nm are precipitated or retained. This causes lack of effective titanium content. As a result, the number of TiC compounds, which are dispersedly precipitated at the time of high frequency induction heating, is not more than 50 per $\mu m^2$ and, consequently, the grain size properties are deteriorated. Further, upon the reheating to the temperature range of 1,100 to 1,250° C., TiC begins to form a solid solution. In this case, after cooling, coherent precipitation occurs, and fine titanium compounds having a size of not more than 10 nm, which bring about an increase in hardness, are precipitated in large quantities. As a result, the number of titanium compounds after hot working is not less than 10,000 per $\mu m^2$. This brings about an increase in hardness which disadvantageously deteriorates the machinability.

On the other hand, when the temperature, to which the steel is reheated after cooling to room temperature from 1,250° C. or above, is below 800° C., or when the steel is not reheated at all, coherent precipitation occurs and fine titanium compounds having a size of not more than 10 nm, which bring about an increase in hardness, are precipitated in large quantities. As a result, the number of titanium compounds is not less than 10,000 per $\mu m^2$. This brings about an increase in hardness which disadvantageously deteriorates the machinability.

According to a preferred embodiment of the present invention, the above-described series of hot working steps are carried out so as to satisfy a requirement that the number of titanium compounds dispersedly precipitated in the steel product upon the hot working is not more than 10,000 per $\mu m^2$ and, when the steel product is subjected to high frequency induction heating after the hot working, the number of dispersedly precipitated titanium compounds is not less than 50 per $\mu m^2$. Specifically, when the number of titanium compounds, which are dispersedly precipitated upon hot working (rolling and/or forging), are more than 10,000 per $\mu m^2$, the hardness is disadvantageously enhanced due to precipitation strengthening effect. Consequently, the machinability is deteriorated. On the other hand, when the number of titanium compounds dispersedly precipitated at the time of high frequency induction heating is not more than 50 per $\mu m^2$, the number of precipitates, which suppress the coarsening of grains at the time of high frequency induction heating, is so small that the grain size properties are deteriorated.

According to a preferred embodiment of the present invention, the production process further comprises the step of cooling the steel product after the above series of hot working and, in the step of cooling, the steel product is cooled from 800° C. to 500° C. at an average cooling rate of not more than 5° C./sec to bring the hardness of the steel product after the hot working to not more than 103 HRB (or not more than 25 HRC). Specifically, when the average rate of cooling from 800° C. to 500° C. after the final hot working exceeds 5° C./sec, bainite and fine pearlite are formed. Due to this phenomenon, the hardness after hot working exceeds 103 HRB (or exceeds 25 HRC), leading to a fear of deteriorating the machinability.

Thus, according to the second aspect of the present invention, the number of titanium compounds dispersedly precipitated upon hot working can be brought to not more than 10,000 per $\mu m^2$, and, in addition, the number of titanium compounds dispersedly precipitated at the time of subsequent high frequency induction heating can be brought to not less than 50 per $\mu m^2$. By virtue of this, a steel product for induction hardening possessing excellent grain size properties and machinability can be provided. Further, when the average rate of cooling from 800° C. to 500° C. after the final hot working is not more than 5° C./sec, the hardness of the steel after the hot working can be brought to not more than 103 HRB (or not more than 25 HRC) and, consequently, a deterioration in machinability can be prevented.

EXAMPLES

Example A

Examples of the first aspect of the present invention will be illustrated based on Example A. Chemical compositions of steels used in Example A are shown in Table A1. In this table, "steel of invention" refers to a steel usable in the production process of the present invention, and "comp. steel" refers to a steel other than the steels usable in the production process of the present invention. In Table A1, steel A1 of invention is an SCr-base steel with titanium added thereto, and steel A2 of invention an SCM-B-base steel with titanium added thereto. Further, in Table A1, comparative steels are shown in comparison with the steels of invention. Specifically, comp. steel A3 is an SCr-base steel, comp. steel A4 an SCr-base steel with a minor amount of titanium added thereto, and comp. steel A5 an SCM-base steel with a large amount of nitrogen added thereto. SCr is a class of steel specified in JIS (Japanese Industrial Standards) G4104 (1979), and SCM a class of steel specified in JIS G 4105 (1979).

TABLE A1

| No. | (weight %) | | | | | | | | | | | |
|---|---|---|---|---|---|---|---|---|---|---|---|---|
| | C | Si | Mn | P | S | Ni | Cr | Mo | Al | Ti | Sol-B | N |
| Steel 1 of invention | 0.20 | 0.18 | 0.75 | 0.019 | 0.019 | 0.10 | 1.01 | 0.01 | 0.029 | 0.14 | 0.0002 | 0.0064 |
| Steel 2 of invention | 0.24 | 0.21 | 0.79 | 0.016 | 0.013 | 0.06 | 1.13 | 0.19 | 0.032 | 0.09 | 0.0023 | 0.0073 |
| Comp. steel 3 | 0.20 | 0.23 | 0.81 | 0.012 | 0.014 | 0.08 | 1.08 | 0.02 | 0.030 | 0.01 | 0.0002 | 0.0162 |

TABLE A1-continued

| No. | C | Si | Mn | P | S | Ni | Cr | Mo | Al | Ti | Sol-B | N |
|---|---|---|---|---|---|---|---|---|---|---|---|---|
| Comp. steel 4 | 0.21 | 0.26 | 0.83 | 0.013 | 0.012 | 0.07 | 1.06 | 0.02 | 0.033 | 0.04 | 0.0001 | 0.0057 |
| Comp. steel 5 | 0.19 | 0.22 | 0.78 | 0.011 | 0.015 | 0.09 | 0.99 | 0.15 | 0.030 | 0.16 | 0.0003 | 0.0157 |

In the table, steels 1 to 5 refer to steels A1 to A5, respectively.

Ingots of steels of the present invention and comparative steels having chemical compositions shown in Table A1 as sample steels were prepared by a melting process in a vacuum melting furnace. The ingots of the sample steels were hot rolled into semi-finished steel products which were then cooled to room temperature. The semi-finished steel products were subjected to steel bar rolling. Specifically, the semi-finished steel products were reheated and were hot rolled into a size of 65 mmφ, followed by cooling to room temperature. Thereafter, the rolled products were forged into components, that is, were hot forged into a size of 30 mmφ to prepare hot forged products. The heating temperatures in the above hot working steps were as shown in Table A2. Cooling after the hot working was air cooling. For steel No. A4, after hot forging into the size of 30 mmφ, the forged product was fan cooled.

The following items were measured on hot forged products thus obtained.

Number of Titanium Compounds Per $\mu m^2$ After the Hot Working:

The surface of each of the hot forged products was observed under a transmission electron microscope to count the number of titanium compounds after the hot working.

Number of Titanium Compounds Per $\mu m^2$ at the Time of Carburizing:

Each of the hot forged products was pseudo-carburized at 1,000° C. for 2 hr and was quenched. Thereafter, the surface of the steel was observed under a transmission electron microscope to count the number of titanium compounds which had been dispersedly precipitated during the carburizing.

Carburized Grain Size No.:

Each of the hot forged products was pseudo-carburized at 1,000° C. for 2 hr. Thereafter, former austenite grains were observed using saturated picric acid, and the carburized grain size No. was calculated based on the results.

Hardness:

Rockwell hardness (HRB) was measured on each of the hot forged products.

Evaluation of Machinability (Drilling Test):

Each of the hot forged products was drilled. A drillability index was calculated by dividing the time necessary for drilling each of the hot forged products by the time necessary for drilling SCR 420 of steel No. 7 in Table A2.

The results were as shown in Table A2.

TABLE A2

| Type of steel | No. | Heating temp. in rolling into semi-finished steel product | Heating temp. in rolling into steel bar | Heating temp. in forging into component | No. of Ti compounds after hot working, per $\mu m^2$ | No. of Ti com-pounds at the time of carburizing, per $\mu m^2$ | Carburized grain size No. | Hardness, HRB | Drillability index | Rate of cooling from 800° C. to 500° C. after forging into component, ° C./sec |
|---|---|---|---|---|---|---|---|---|---|---|
| Steel 1 of invention | 1 | 1270 | 1050 | 1080 | 4030 | 350 | 9.2 | 82 | 1.1 | 2.3 |
|  | 2 | 1150 | 1060 | 1080 | 1490 | 39 | 4.6 | 81 | 1.1 | 2.3 |
|  | 3 | 1260 | 1080 | 1150 | 14300 | 32 | 4.3 | 93 | 1.6 | 2.3 |
|  | 4 | 1270 | 1050 | 1080 | 3990 | 340 | 9.0 | 104 | 2.3 | 5.2 |
| Steel 2 of invention | 5 | 1290 | 1000 | 1070 | 5120 | 270 | 8.8 | 86 | 1.2 | 2.3 |
|  | 6 | 1170 | 1070 | 1090 | 1740 | 47 | 4.7 | 84 | 1.2 | 2.3 |
|  | 7 | 1300 | 1040 | 1130 | 12800 | 36 | 4.0 | 103 | 2.2 | 2.3 |
| Comp. steel 3 | 8 | 1270 | 1050 | 1080 | 20 | 4 | 3.2 | 79 | 1 | 2.3 |
| Comp. steel 4 | 9 | 1270 | 1050 | 1080 | 890 | 24 | 4.4 | 81 | 1.1 | 2.3 |
| Comp. steel 5 | 10 | 1270 | 1050 | 1080 | 280 | 31 | 4.7 | 82 | 1.1 | 2.3 |

In the table, steels 1 to 5 refer to steels A1 to A5, respectively.

The results shown in Table A2 reveal the following facts. For No. 1 and No. 5, both grain size properties and machinability are excellent because both the chemical composition and the hot working conditions are good. On the other hand, for No. 2 and No. 6, the heating temperature at the time of rolling into the semi-finished steel product is so low that the number of titanium compounds upon carburizing is unsatisfactory, resulting in poor grain size properties. For No. 3 and No. 7, the heating temperature at the time of forging into the component is so high that a large amount of titanium compound is precipitated after hot working, resulting in high hardness and, in its turn, poor machinability. For No. 4, the rate of cooling after forging into the component is so high that bainite is formed, resulting in high hardness and, in its turn, poor machinability. For No. 8 and No. 9, the amount of titanium added is so small that the amount of titanium compound is unsatisfactory, resulting in poor grain size properties. For No. 10, since the amount of nitrogen added is large, a large amount of TiN, which cannot be dissolved in a solid phase, is precipitated. Therefore, the amount of effective titanium is unsatisfactory, and the number of titanium compounds at the time of carburizing is unsatisfactory, resulting in poor grain size properties.

Example B

Examples of the second aspect of the present invention will be illustrated based on Example B. Chemical compositions of steels used in Example B are shown in Table B1. In this table, "steel of invention" refers to a steel usable in the production process of the present invention, and "comp. steel" refers to a steel other than the steels usable in the production process of the present invention. In Table B1, steel B1 of invention is an SC-base steel with titanium added thereto, steel B2 of invention an SC-B-base steel with titanium added thereto, and steel B3 of invention an SCr-base steel with titanium added thereto. Further, in Table B1, comparative steels are shown in comparison with the steels of invention. Specifically, comp. steel B4 is an SC-base steel, comp. steel B5 an SC-base steel with a minor amount of titanium added thereto, and comp. steel B6 an SCr-base steel with a large amount of nitrogen added thereto. SC is a class of steel specified in JIS (Japanese Industrial Standards) G5101 (1991), and SCr a class of steel specified in JIS G 4104 (1979).

Ingots of steels of the present invention and comparative steels having chemical compositions shown in Table B1 as sample steels were prepared by a melting process in a vacuum melting furnace. The ingots of the sample steels were hot worked into semi-finished steel products which were then cooled to room temperature. The semi-finished steel products were subjected to steel bar rolling. Specifically, the semi-finished steel products were reheated and were hot rolled into a size of 65 mmφ, followed by cooling to room temperature. Thereafter, the rolled products were forged into components, that is, were hot forged into a size of 30 mmφ to prepare hot forged products. The heating temperatures in the above hot working steps were as shown in Table B2. Cooling after the hot working was air cooling. For steel No. B4, after hot forging into the size of 30 mmφ, the forged product was fan cooled.

The following items were measured on hot forged products thus obtained.

Number of Titanium Compounds Per $\mu m^2$ After the Hot Working:

The surface of each of the hot forged products was observed under a transmission electron microscope to count the number of titanium compounds after the hot working.

Number of Titanium Compounds Per $\mu m^2$ at the Time of High Frequency Induction Heating:

Each of the hot forged products was subjected to high frequency induction heating at 1,000° C. for 25 sec and was quenched. Thereafter, the surface of the steel was observed under a transmission electron microscope to count the number of titanium compounds which had been dispersedly precipitated at the time of the high frequency induction heating.

Grain Size No.:

Each of the hot forged products was subjected to induction hardening under conditions of 1,000° C. and 25 sec. Thereafter, former austenite grains were observed using saturated picric acid, and the grain size No. was calculated based on the results.

Hardness:

Rockwell hardness (HRB) was measured on each of the hot forged products.

Evaluation of Machinability (Drilling Test):

Each of the hot forged products was drilled. A drillability index was calculated by dividing the time necessary for drilling each of the hot forged products by the time necessary for drilling No. 11 in Table B2.

TABLE B1

| | | (weight %) | | | | | | | | | | | |
|---|---|---|---|---|---|---|---|---|---|---|---|---|---|
| No. | | C | Si | Mn | P | S | Ni | Cr | Mo | Al | Ti | Sol-B | N |
| Steel of | 1 | 0.45 | 0.15 | 0.85 | 0.018 | 0.029 | 0.11 | 0.14 | 0.01 | 0.019 | 0.13 | 0.0001 | 0.0054 |
| invention | 2 | 0.54 | 0.09 | 0.34 | 0.017 | 0.018 | 0.07 | 0.13 | 0.02 | 0.012 | 0.08 | 0.0025 | 0.0073 |
| | 3 | 0.34 | 0.24 | 0.79 | 0.023 | 0.021 | 0.09 | 1.05 | 0.01 | 0.026 | 0.17 | 0.0001 | 0.0094 |
| Comp. steel | 4 | 0.43 | 0.22 | 0.83 | 0.014 | 0.015 | 0.08 | 0.09 | 0.01 | 0.020 | 0.02 | 0.0003 | 0.0103 |
| | 5 | 0.52 | 0.24 | 0.82 | 0.011 | 0.017 | 0.06 | 0.12 | 0.01 | 0.031 | 0.04 | 0.0002 | 0.0068 |
| | 6 | 0.41 | 0.21 | 0.88 | 0.013 | 0.012 | 0.13 | 1.02 | 0.01 | 0.021 | 0.06 | 0.0002 | 0.0186 |

In the table, steels 1 to 6 refer to steels B1 to B6, respectively.

The results were as shown in Table B2.

TABLE B2

| Type of steel | No. | Heating temp. in rolling into semi-finished steel product | Heating temp. in rolling into steel bar | Heating temp. in forging into component | No. of Ti compounds after hot working, per $\mu m^2$ | No. of Ti compounds at the time of high frequency induction heating, per $\mu m^2$ | Grain size No. | Hardness, HRB | Drillability index |
|---|---|---|---|---|---|---|---|---|---|
| Steel 1 | 1 | 1280 | 1040 | 1070 | 3960 | 420 | 9.3 | 98 | 1.1 |
| of | 2 | 1140 | 1070 | 1060 | 1620 | 37 | 4.6 | 96 | 1.1 |
| invention | 3 | 1250 | 1060 | 1160 | 16400 | 28 | 4.3 | 105 | 1.5 |
|  | 4 | 1260 | 1070 | 1090 | 4730 | 380 | 9.2 | 107 | 4.2 |
| Steel 2 | 5 | 1270 | 1010 | 1060 | 5830 | 310 | 8.2 | 102 | 1.3 |
| of | 6 | 1160 | 1060 | 1070 | 1570 | 47 | 4.6 | 100 | 1.2 |
| invention | 7 | 1280 | 1020 | 1140 | 14200 | 29 | 4.2 | 108 | 3.2 |
| Steel 3 | 8 | 1280 | 1050 | 1070 | 8630 | 630 | 9.8 | 101 | 1.1 |
| of | 9 | 1150 | 1030 | 1050 | 4360 | 38 | 4.3 | 101 | 1.1 |
| invention | 10 | 1250 | 1010 | 1130 | 18300 | 47 | 4.7 | 107 | 3.5 |
| Comp. steel 4 | 11 | 1280 | 1040 | 1070 | 46 | 7 | 2.7 | 96 | 1 |
| Comp. steel 5 | 12 | 1280 | 1040 | 1070 | 1130 | 26 | 4.1 | 100 | 1.1 |
| Comp. steel 6 | 13 | 1280 | 1040 | 1070 | 78 | 9 | 4.0 | 102 | 1.3 |

In the table, steels 1 to 6 refer to steels B1 to B6, respectively.

The results shown in Table B2 reveal the following facts. For No. 1, No. 5, and No. 8, both grain size properties and machinability are excellent because both the chemical composition and the hot working conditions are good. On the other hand, for No. 2, No. 6, and No. 9, the heating temperature at the time of rolling into the semi-finished steel product is so low that the number of titanium compounds at the time of high frequency induction heating is unsatisfactory, resulting in poor grain size properties. For No. 3, No. 7, and No. 10, the heating temperature at the time of forging into the component is so high that a large amount of titanium compound is precipitated after hot working, resulting in high hardness and, in its turn, poor machinability. For No. 4, the rate of cooling after forging into the component is so high that bainite is formed, resulting in high hardness and, in its turn, poor machinability. For No. 11 and No. 12, the amount of titanium added is so small that the amount of titanium compound is unsatisfactory, resulting in poor grain size properties. For No. 13, since the amount of nitrogen added is large, a large amount of TiN, which cannot be dissolved in a solid phase, is precipitated. Therefore, the amount of effective titanium is unsatisfactory, and the number of titanium compounds at the time of high frequency induction heating is unsatisfactory, resulting in poor grain size properties.

The invention claimed is:

1. A process for producing a titanium(Ti)-containing steel product for carburizing, said process comprising the steps of:
providing an ingot or bloom comprising a steel comprising, by weight, carbon (C): 0.10 to 0.45%, silicon (Si): 0.03 to 1.0%, manganese (Mn): 0.2 to 2.0%, titanium (Ti): 0.05 to 0.2%, aluminum (Al): 0.005 to 0.05%, and nitrogen (N): not more than 0.01% with the balance consisting of iron (Fe) and unavoidable impurities; and
subjecting said steel ingot or bloom to a series of hot working steps including the steps of:
(a) rolling the steel ingot or bloom into a semi-finished steel product,
(b) rolling the semi-finished steel product into a steel bar or wire rod, and
(c) forging the steel bar or wire rod into a product, wherein, in said series of hot working steps, said steel is given a thermal history which may take place in any order during the working steps (a) to (c), said thermal history comprising the steps of:
(i) at least once heating said steel to 1,250° C. or above,
(ii) cooling to room temperature, and
(iii) reheating to a temperature range of 800 to 1,100° C., and cooling the steel product after said series of hot working steps, wherein the steel product is cooled from 800° C. to 500° C. at an average cooling rate of not more than 5° C./sec to bring the hardness of the steel product after the hot working to not more than 100 HRB.

2. The process according to claim 1, wherein said steel further comprises, by weight, one or more elements selected from boron (B): 0.0005 to 0.0050%, chromium (Cr): not more than 2.0%, nickel (Ni): not more than 3.0%, and molybdenum (Mo): not more than 1.5%.

3. The process according to claim 1 or 2, wherein said steel further comprises, by weight, one or more elements selected from vanadium (V): 0.02 to 0.30% and niobium (Nb): 0.02 to 0.10%.

4. The process according to claim 1 or 2, wherein said steel further comprises, by weight, one or more elements selected from lead (Pb): not more than 0.3%, bismuth (Bi): not more than 0.3%, sulfur (S): not more than 0.2%, and calcium (Ca): not more than 0.01%.

5. The process according to claim 1 or 2, wherein said series of hot working steps are carried out so as to satisfy a requirement that the number of titanium compounds dispersely precipitated in the steel product upon the hot working is not more than 10,000 per $\mu m^2$ and, when the steel product has been carburized after the hot working, the number of dispersedly precipitated titanium compounds is not less than 50 per $\mu m^2$.

6. The process according to claim 1 or 2, wherein said steel further comprises, by weight,
one or more elements selected from vanadium (V): 0.02 to 0.30% and niobium (Nb): 0.02 to 0.10% and one or more elements selected from lead (Pb): not more than 0.3%, bismuth (Bi): not more than 0.3%, sulfur (S): not more than 0.2%, and calcium (Ca): not more than 0.0 1%.

7. A process for producing a titanium(Ti)-containing steel product for induction hardening, said process comprising the steps of:
providing an ingot or bloom comprising a steel comprising, by weight, carbon (C): 0.25 to 0.70%, silicon (Si): 0.03 to 1.0%, manganese (Mn): 0.2 to 2.0%, titanium (Ti): 0.05 to 0.2%, aluminum (Al): 0.005 to 0.05%, and nitrogen (N): not more than 0.01% with the balance consisting of iron (Fe) and unavoidable impurities; and
subjecting said steel ingot or bloom to a series of hot working steps including the steps of:
(a) rolling the steel ingot or bloom into a semi-finished steel product,
(b) rolling the semi-finished steel product into a steel bar or wire rod, and
(c) forging the steel bar or wire rod into a product, wherein, in said series of hot working steps, said steel is given a thermal history which may take place in any order during the hot working steps (a) to (c), said thermal history comprising the steps of:
(i) at least once heating said steel to 1,250° C. or above,
(ii) cooling to room temperature, and
(iii) reheating to a temperature range of 800° C. to 1,100° C., and cooling the steel product after said series of hot working steps, wherein the steel product is cooled from 800° C. to 500° C. at an average cooling rate of not more than 5° C./sec to bring the hardness of the steel product after the hot working to not more than 103 HRB.

8. The process according to claim 7, wherein said steel further comprises, by weight, one or more elements selected from boron (B): 0.0005 to 0.0050%, chromium (Cr): not more than 2.0%, nickel (Ni): not more than 3.0%, and molybdenum (Mo): not more than 1.5%.

9. The process according to claim 7 or 8, wherein said steel further comprises, by weight, one or more elements selected from vanadium (V): 0.02 to 0.30% and niobium (Nb): 0.02 to 0.10%.

10. The process according to claim 7 or 8, wherein said steel further comprises, by weight, one or more elements selected from lead (Pb): not more than 0.3%, bismuth (Bi): not more than 0.3%, sulfur (S): not more than 0.2%, and calcium (Ca): not more than 0.01%.

11. The process according to claim 7 or 8, wherein said series of hot working steps are carried out so as to satisfy a requirement that the number of titanium compounds dispersedly precipitated in the steel product upon the hot working is not more than 10,000 per $\mu m^2$ and, when said steel product has been subjected to high frequency induction heating after the hot working, the number of dispersedly precipitated titanium compounds is not less than 50 per $\mu m^2$.

12. The process according to claim 7 or 8, wherein said steel further comprises, by weight,
one or more elements selected from vanadium (V): 0.02 to 0.30% and niobium (Nb): 0.02 to 0.10% and
one or more elements selected from lead (Pb): not more than 0.3%, bismuth (Bi): not more than 0.3%, sulfur (S): not more than 0.2%, and calcium (Ca): not more than 0.01%.

* * * * *